United States Patent
Mceuen et al.

(10) Patent No.: US 9,568,956 B2
(45) Date of Patent: Feb. 14, 2017

(54) APPARATUS, SYSTEM AND METHOD FOR A COLLAPSING KEYBOARD

(75) Inventors: Shawn S. Mceuen, Portland, OR (US); James M. Okuley, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 312 days.

(21) Appl. No.: 13/977,135

(22) PCT Filed: Sep. 29, 2011

(86) PCT No.: PCT/US2011/053932
§ 371 (c)(1),
(2), (4) Date: May 28, 2014

(87) PCT Pub. No.: WO2013/048404
PCT Pub. Date: Apr. 4, 2013

(65) Prior Publication Data
US 2014/0301029 A1 Oct. 9, 2014

(51) Int. Cl.
*G06F 1/16* (2006.01)
*G06F 3/02* (2006.01)

(52) U.S. Cl.
CPC ........... *G06F 1/1666* (2013.01); *G06F 3/0221* (2013.01)

(58) Field of Classification Search
CPC .... G06F 1/1666; G06F 1/1671; G06F 1/1664; G06F 1/1667; G06F 1/1669; G06F 3/0221; G06F 3/0208; G06F 3/0202; H01H 13/86
USPC .............. 361/679.11–679.13, 679.14–679.17
See application file for complete search history.

(56) References Cited

U.S. PATENT DOCUMENTS

| | | | |
|---|---|---|---|
| 5,534,891 A | 7/1996 | Takano | |
| 5,712,760 A * | 1/1998 | Coulon | G06F 1/1616 345/905 |
| 6,174,097 B1 * | 1/2001 | Daniel | G06F 3/0221 400/472 |
| 6,734,809 B1 | 5/2004 | Olodort et al. | |

(Continued)

FOREIGN PATENT DOCUMENTS

| | | |
|---|---|---|
| JP | 2004030129 A | 1/2004 |
| KR | 20080047643 | 5/2008 |

(Continued)

OTHER PUBLICATIONS

Office Action received for Taiwanese Patent Application No. 101134922, mailed Nov. 25, 2015, 5 pages including 1 page English translation.

(Continued)

*Primary Examiner* — Courtney Smith
*Assistant Examiner* — Christopher L Augustin

(57) ABSTRACT

Some embodiments of an apparatus, system and method are described for a collapsible keyboard apparatus and computing system. A collapsible keyboard apparatus may comprise a plurality of keys supported by a first support structure and a set of keys supported by a second support structure pivotally coupled to the first support structure. The second support structure may be arranged to rotate around the pivotal coupling from a first position substantially coplanar with the first support structure to a second non-coplanar position in response to a force applied to the second support structure. Other embodiments are described.

19 Claims, 12 Drawing Sheets

(56) References Cited

U.S. PATENT DOCUMENTS

| | | | |
|---|---|---|---|
| 6,798,649 B1* | 9/2004 | Olodort | G06F 1/1618 235/61 R |
| 6,950,038 B2 | 9/2005 | Hsu | |
| 7,203,058 B2 | 4/2007 | Hong | |
| 7,375,295 B2 | 5/2008 | Hsu | |
| 2002/0175957 A1* | 11/2002 | Huang | G06F 3/0221 715/863 |
| 2003/0197628 A1 | 10/2003 | Hsu | |
| 2004/0204197 A1* | 10/2004 | Moon | G06F 1/1616 455/575.1 |
| 2005/0288072 A1 | 12/2005 | Kemppinen | |
| 2007/0152113 A1 | 7/2007 | Okuley et al. | |
| 2007/0217131 A1 | 9/2007 | Kehr | |
| 2008/0253822 A1 | 10/2008 | Matias | |
| 2012/0009000 A1* | 1/2012 | Starrett | G06F 1/1632 400/472 |
| 2014/0301029 A1 | 10/2014 | Mceuen et al. | |

FOREIGN PATENT DOCUMENTS

| | | |
|---|---|---|
| KR | 20110068712 | 6/2011 |
| WO | 8400518 | 2/1984 |

OTHER PUBLICATIONS

Office Action received for Korean patent Application No. 2014-7008096, mailed Dec. 19, 2014, 7 pages including 3 pages English translation.

Office Action received for Japanese Patent Application No. 2014-531784, mailed Mar. 26, 2015, 5 pages including 2 pages English translation.

Extended European Search Report received for European Patent Application No. 11873474.8, mailed Apr. 7, 2015, 8 pages.

International Search Report and Written Opinion, Mailed Date: May 29, 2012, Application No. PCT/US2011/053932, Filed Date: Sep. 29, 2011, pp. 10.

Search Report received for Taiwanese Patent Application No. 101134922, mailed Oct. 13, 2014, 2 pages including 1 page English translation.

* cited by examiner

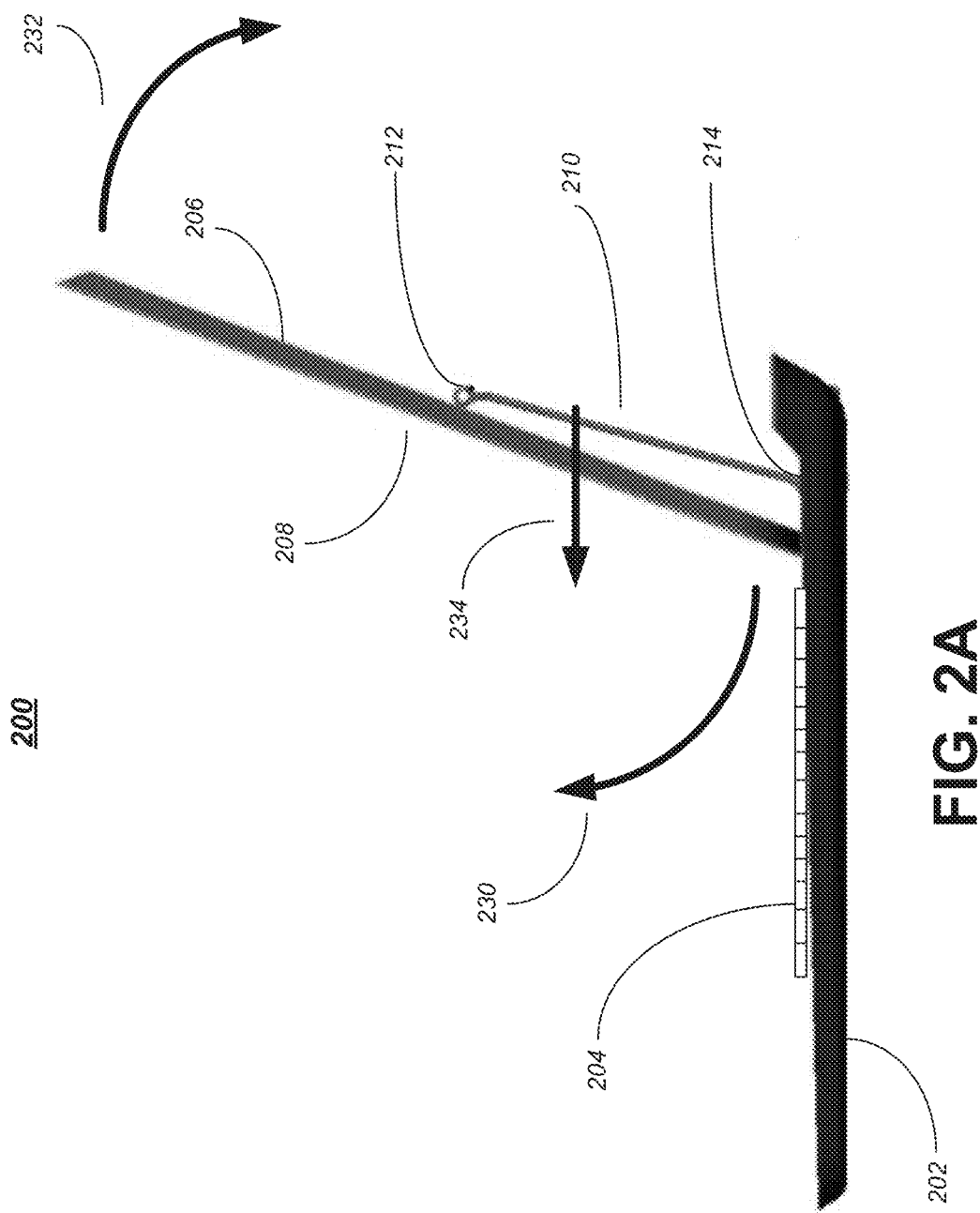

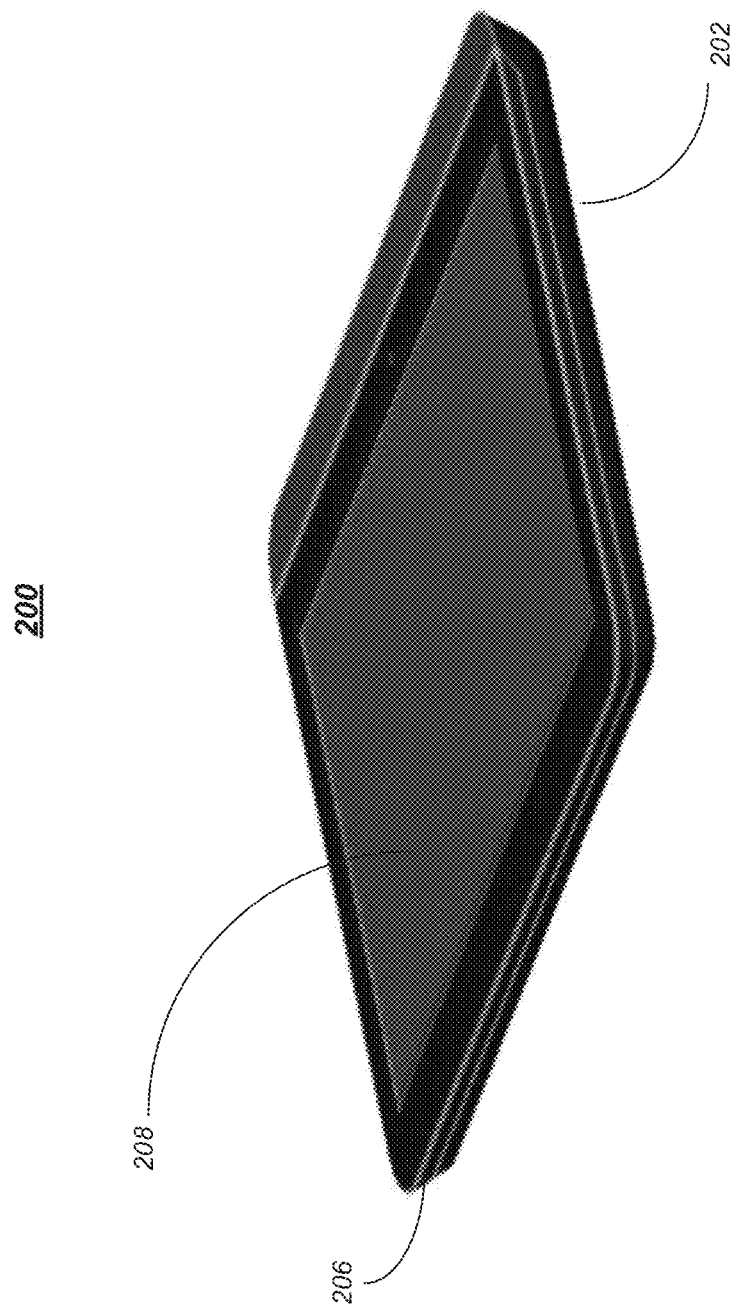

```
┌─────────────────────┐   ┌─────────────────────┐   ┌─────────────────────┐
│ ARRANGE A FIRST OF  │   │ ARRANGING THE       │   │ ARRANGING THE       │
│ KEYS SUPPORTED BY A │   │ SECOND SUPPORT      │   │ SECOND SUPPORT      │
│ FIRST SUPPORT       │   │ STRUCTURE TO BE     │   │ STRUCTURE TO ROTATE │
│ STRUCTURE TO BE     ├───┤ BIASED IN A FIRST   ├───┤ AROUND THE PIVOTAL  │
│ PIVOTALLY COUPLED   │   │ POSITION            │   │ COUPLING FROM A     │
│ TO A SUBSET OF KEYS │   │ SUBSTANTIALLY       │   │ FIRST POSITION TO A │
│ SUPPORTED BY A      │   │ COPLANAR WITH THE   │   │ SECOND NON-COPLANAR │
│ SECOND SUPPORT      │   │ FIRST SUPPORT       │   │ POSITION IN         │
│ STRUCTURE           │   │ STRUCTURE           │   │ RESPONSE TO A FORCE │
│                     │   │                     │   │ APPLIED TO THE      │
│                     │   │                     │   │ SECOND SUPPORT      │
│                     │   │                     │   │ STRUCTURE           │
│         302         │   │         304         │   │         306         │
└─────────────────────┘   └─────────────────────┘   └─────────────────────┘
```

APPARATUS, SYSTEM AND METHOD FOR A COLLAPSING KEYBOARD

BACKGROUND

Modern computing systems continue to evolve in size, shape and functionality. In particular, computing devices continue to decrease in size while functionality continues to increase. For example, designing computing systems with a thin or ultra-thin platform design is becoming an increasing important consideration, while these same systems are expected to function in any number of different configurations. Furthermore, in addition to thin designs, modern computing system designs are also expected to be functional and aesthetically appealing. Traditional computing systems include keyboards and other input devices. These devices occupy valuable space in the platform design and, in the past, have limited the design of computing systems. Consequently, a need exists for a collapsible keyboard for computing systems.

BRIEF DESCRIPTION OF THE DRAWINGS

FIG. 2A illustrates one embodiment of a fifth apparatus.
FIG. 2C illustrates one embodiment of a seventh apparatus.
FIG. 3 illustrations one embodiment of a logic diagram.

DETAILED DESCRIPTION

Figure 1A:
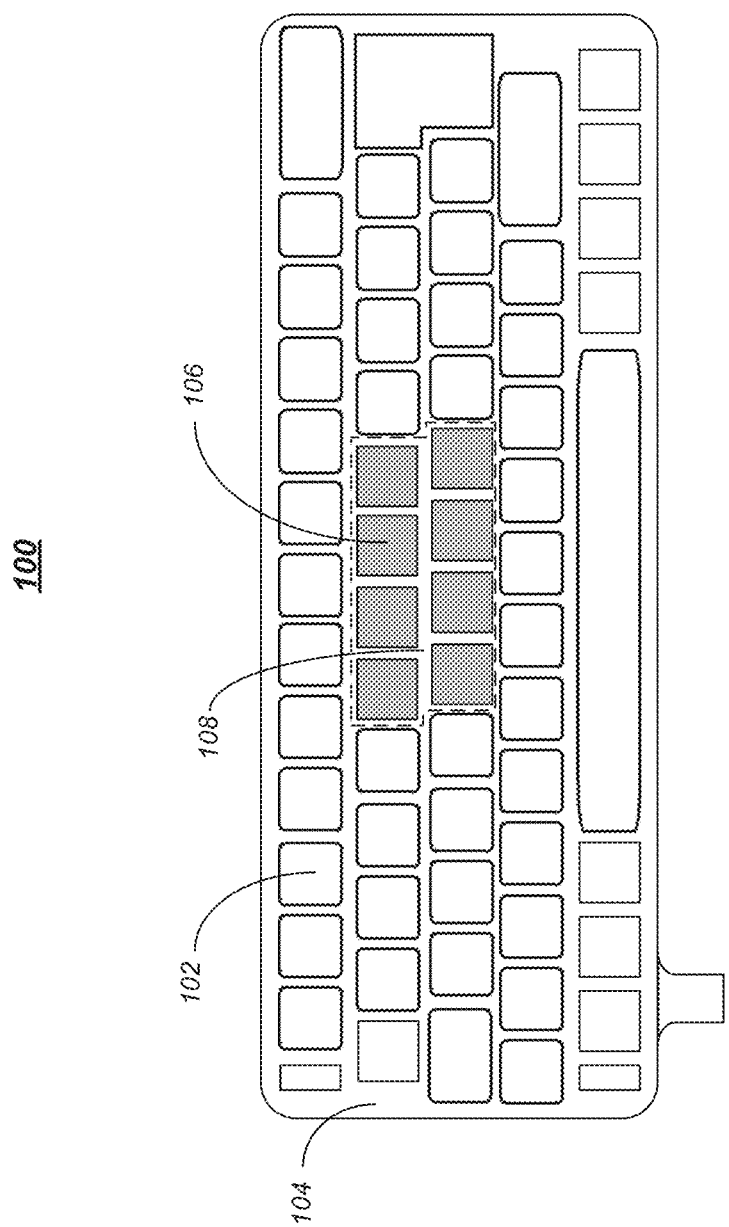
FIG. 1A illustrates one embodiment of a first apparatus.

Some embodiments are generally directed to techniques for a collapsible keyboard. Various embodiments provide techniques that include a collapsible keyboard comprising a plurality of keys supported by a first support structure and a set of keys supported by a second support structure pivotally coupled to the first support structure. In various embodiments, the second support structure may be arranged to rotate around the pivotal coupling from a first position substantially coplanar with the first support structure to a second non-coplanar position in response to a force applied to the second support structure. Other embodiments are described and claimed.

Many system that are intended to be thin or ultra thin in their design are limited by the keyboard or other input device of the system that may occupy a major portion of one surface of the system. This may be especially true for a convertible system arranged to be converted between a tablet configuration and notebook configuration. This may be due in part to the fact that the lid of a convertible system may require hinge areas that require a minimum diameter to function properly.

The hinge area on a back side of the lid of a convertible system may coincide with the keyboard area when the lid is in the closed tablet configuration and, as a result, the thickness of the keyboard and the diameter of the hinge area must be added together in a calculation of the total system thickness. In many current systems, if a hinge area of a lid, or other possible protrusions on a lid, coincides with the keyboard area, the two items are not able to nest together. Stated differently, conventional system in this arrangement may be required to be thick enough for them to stack the overlapping components on top of each other.

Some current keyboard solutions are designed to fold to make them more compact or suitable for attaching to handheld devices. Other keyboards are designed to collapse all of their keys to enable larger keystroke values during operation. However, none of these current solutions address the need to accommodate the hinge area or other protrusion of the lid of a convertible computing device in a closed or tablet configuration.

Some current systems address these problems by moving the keyboard and arranging a channel in the body of the device to accept the hinge area on the back of the lid. This solution may not be aesthetically pleasing and may result in the elimination of other components. For example, by moving the keyboard to accommodate the hinge area, another input device such as a trackpad or pointing device may be eliminated. In various embodiments, in order to remedy these and other problems, various embodiments are directed to a keyboard that is arranged to collapse or move a portion of the keyboard out of the way to make room for the hinge area or other protrusion to nest within the same area normally blocked by the keyboard thereby reducing the overall total thickness of the system.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1A illustrates one embodiment of a keyboard apparatus 100. Keyboard apparatus 100 may comprise a keyboard suitable for use in a computing system in some embodiments. In various embodiments, keyboard apparatus 100 may comprise a set of alphanumeric and command keys used to input information to a computing system. While shown in a certain configuration in FIG. 1A, it should be understood that keyboard apparatus 100 could have any configuration, shape, size, number and type of keys and still fall within the described embodiments.

As shown in FIG. 1A, keyboard apparatus 100 comprises multiple elements, such as keys 102 and 106 and support structures 104 and 108. While a limited number and arrangement of components are shown in FIG. 1A for purposes of illustration, it should be understood that keyboard apparatus 100 may include any number or arrangement of components and still fall within the described embodiments. For example, keyboard apparatus 100 may additionally include, in some embodiments, memory containing instructions to be executed by one or more multi-core processors, a power supply, input/output (I/O) ports or any other suitable components for example. The embodiments, however, are not limited to the elements or the configuration shown in this figure. Additional components for keyboard apparatus 100 and one embodiments of an associated computing system are discussed in further detail below with reference to FIG. 4.

In various embodiments, keyboard apparatus 100 may comprise two or more components assembled or coupled together. In various embodiments, keyboard apparatus 100 may include a main portion that remains rigidly attached to a computer system. This main portion may comprise a first support structure 104 that is arranged to support a plurality of keys 102. A second portion of the keyboard apparatus 100 may comprise a smaller set of keys 106 supported by a second support structure 108 that is attached to the first main portion 104 of the keyboard apparatus 100 via a hinge pin or something similar. For example, the second support structure 108 may be pivotally coupled to the first support structure 104. In some embodiments, the second support structure 108 may also or alternatively be attached to a portion of a computing platform coupled to the keyboard apparatus 100 to allow similar pivotal movement.

In various embodiments, the number and location of the set of keys 106 is selected to accommodate a system design. For example, while eight keys are shown in the set of keys 106 in FIG. 1A, it should be understood that any number of keys could be arranged in the set 106 and still fall within the described embodiments. For example, in some embodiments, the set of keys 106 is limited to one row of keys. Other embodiments are described and claimed.

Figure 1B:
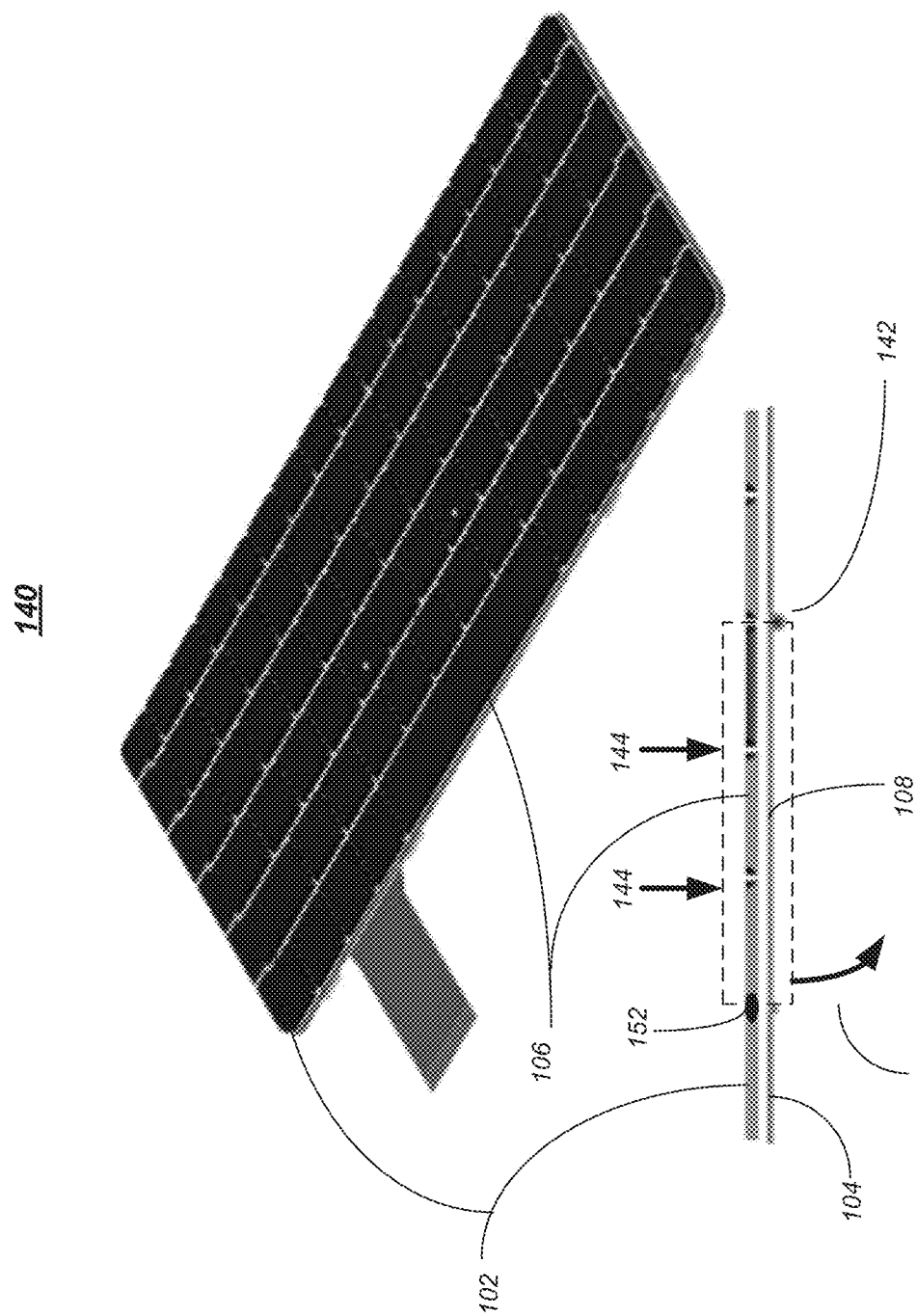
FIG. 1B illustrates one embodiment of a second apparatus.

FIG. 1B illustrate one embodiment of a keyboard apparatus 140. Keyboard apparatus 140 may be the same or similar to keyboard apparatus 100 of FIG. 1A where like elements are similarly numbered. In various embodiments, keyboard apparatus 140 includes a first support structure 104 arranged to support a plurality of keys 102 and a second support structure 108 arranged to support a set of keys 106. As shown in FIG. 1B, the second support structure 108 may be coupled to the first support structure 104 at 142. The coupling 142 may comprise a hinge, hinge pin or other suitable coupling that allows the second support structure 108 to rotate with respect to the first support structure 104.

In various embodiments, the support structures 104 and 108 may comprise rigid surfaces capable of supporting the keys 102 and 104. For example, support structures 104 and 108 may comprise separately formed metal backings for keyboard apparatus 140. They keys 102 and 106 may comprise any suitable key arranged to accept entry of information when pressed or otherwise activated.

In the arrangement shown in FIG. 1B, the first support structure 104 and the second support structure 108 are in a substantially coplanar position. In some embodiments, coupling 142 may including a biasing member comprising a spring or other biasing element to support the second support structure 108 in the coplanar position shown in FIG. 1B. In various embodiments, one or more magnets 152 may be arranged to maintain the second support structure 108 in the first position. For example, the one or more magnets 152 may be coupled to the first support structure 104 and the second support structure 108 may include one or more ferrous surfaces that may be magnetically coupled to the one or more magnets 152.

In some embodiments, the one or more magnets 152 may be selected or arranged to generate a magnetic force that is less than a force 144 applied between two or more of the set of keys to cause the second support structure 108 to rotate to the second position in a direction indicated by arrow 146. In various embodiments, the one or more magnets may be selected or arranged to generate a magnetic force that is greater than a predetermined or estimated typing force. For example, the one or more magnets 152 may be selected to resist separation of the first 104 and second 108 support structures during normal operation and typing, but to release the second support structure 108 from the first support structure 104 in response to force 144. Other embodiments may include solenoids, motors, linkages, bars or other means for attaching the first 104 and second 108 support structures. The embodiments are not limited in this respect.

Figure 1C:
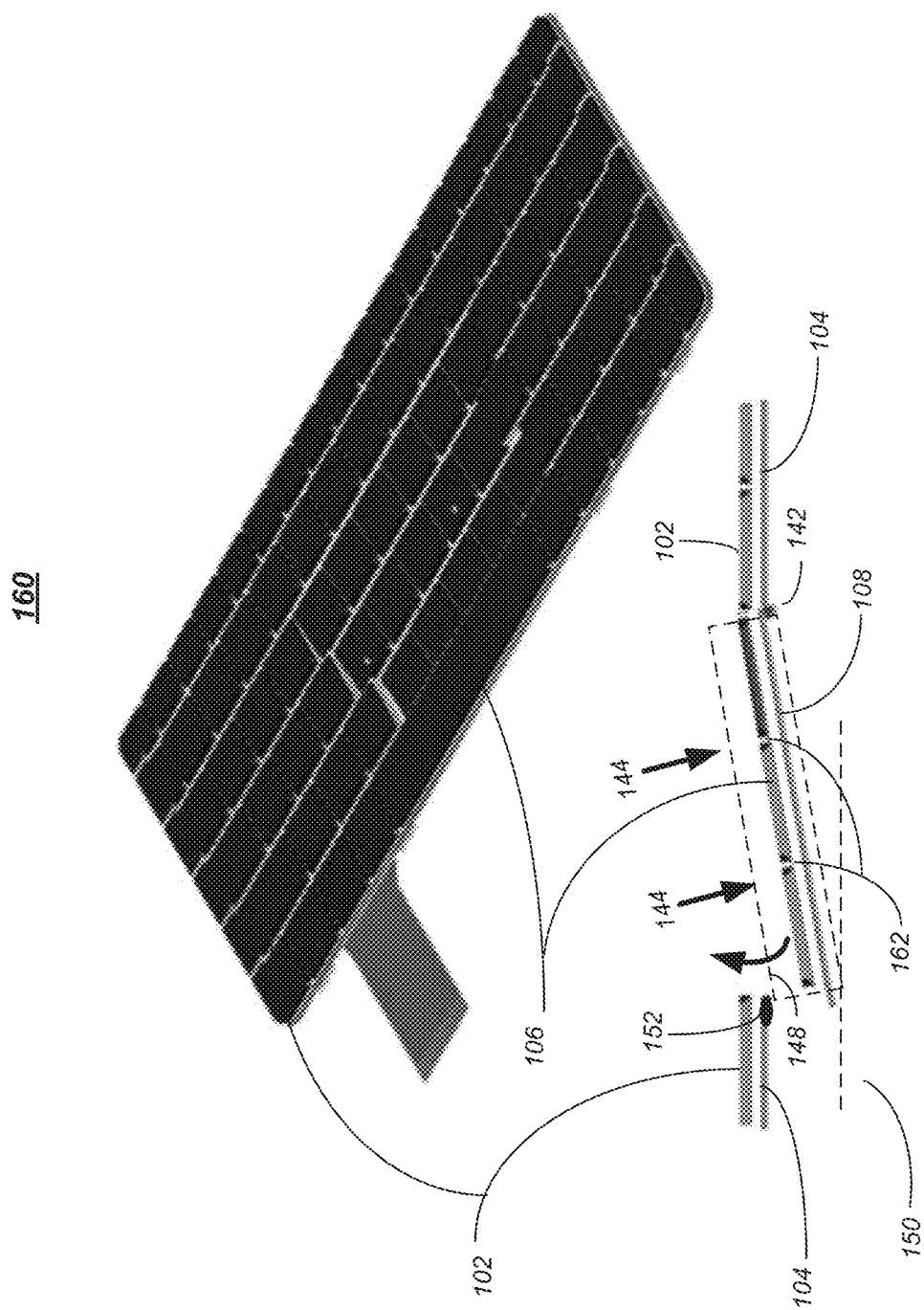
FIG. 1C illustrates one embodiment of a third apparatus.

FIG. 1C illustrate one embodiment of a keyboard apparatus 160. Keyboard apparatus 160 may be the same or similar to keyboard apparatus 100 of FIG. 1A and 140 of FIG. 1B where like elements are similarly numbered. In various embodiments, keyboard apparatus 160 may illustrate, in response to a force 144 as shown in FIG. 1B, the second support structure 108 arranged to rotate around the pivotal coupling 142 from the first position substantially coplanar with the first support structure 104 shown in FIG. 1B to a second non-coplanar position as shown in FIG. 1C in response to force 144.

The second support structure may be arranged to rotate from the first position shown in FIG. 1B to the second position shown in FIG. 1C in response to a force 144 applied to the second support structure between two or more of the set of keys 106 or to one or more spacers 162 between two or more of the set of keys 106 in some embodiments. For example, the instrument contacting the second support structure 108 to apply force 144 may not directly contact the set of keys 106. In various embodiments, the contact to apply force 144 may occur in spaces or gaps between the set of keys 106 or spacer 162 may be located between the keys 106 to receive the contact. Other embodiments are described and claimed.

In various embodiments, a base structure 150 may be to support the first 104 and second support structures 108. For example, the base structure 150 may comprise a bottom portion of the keyboard apparatus 100, 140, 160 or a bottom portion of a computing device associated with keyboard apparatus 100, 140, 160. In some embodiments, the base structure 152 may be arranged to prevent over rotation of the second support structure 108 in the second position shown in FIG. 1C. For example, second support structure 108 may rotate until it contacts base structure 150 to avoid over rotation that may damage the biasing member/coupling 142.

The second support structure 108 may be arranged to rotate from the second position shown in FIG. 1C to the first position shown in FIG. 1B in response to a force applied by the biasing member arranged at the pivotal coupling 142 as indicated by arrow 148. For example, when force 144 is removed, the second support structure may automatically return to the coplanar position shown in FIG. 1B. In some embodiments, a spring or other suitable component may cause the rotation 148 which may result in the second support structure 108 being recoupled to the first support structure 104 by magnets 152 or other suitable coupling components. The embodiments are not limited in this respect.

Figure 1D:
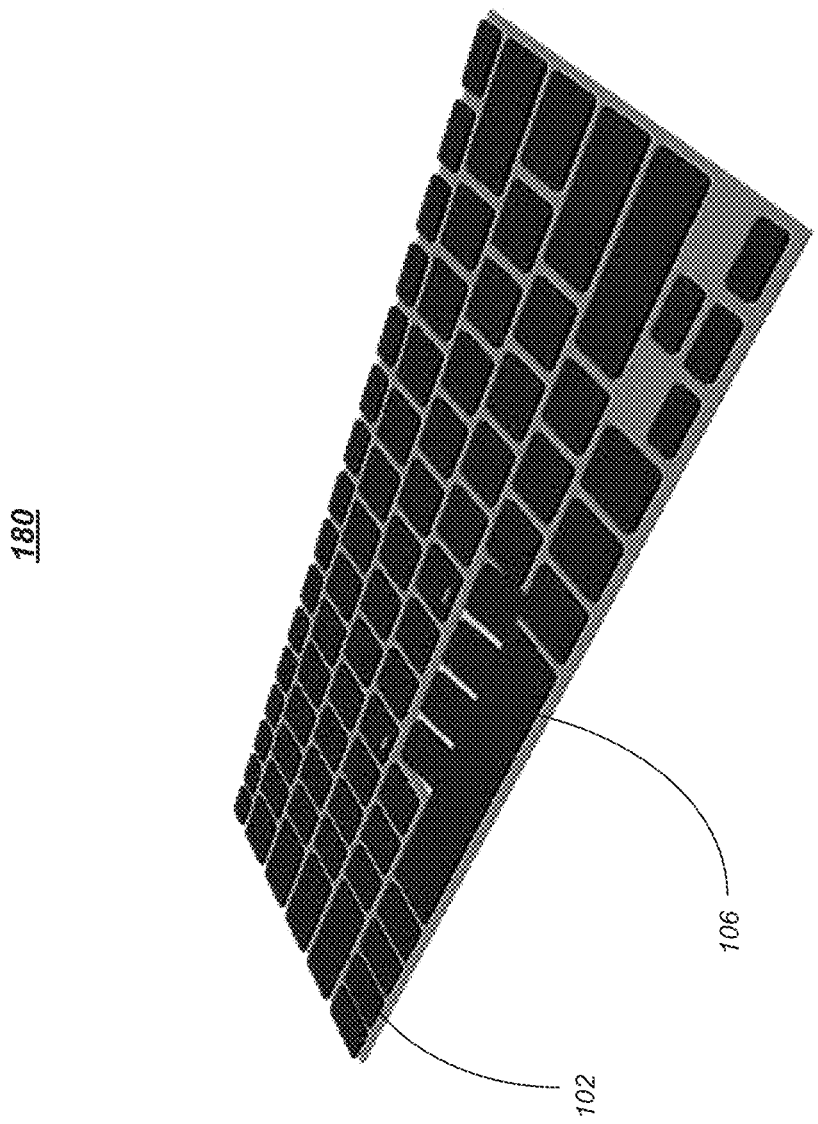
FIG. 1D illustrates one embodiments of a fourth apparatus

FIG. 1D illustrate one embodiment of a keyboard apparatus 180. Keyboard apparatus 180 may be the same or similar to keyboard apparatus 100 of FIG. 1A, 140 of FIG. 1B and 160 of FIG. 1C where like elements are similarly numbered. In various embodiments, keyboard apparatus 180 may illustrate the second support structure 108 arranged to rotate around the pivotal coupling 142 from the first position substantially coplanar with the first support structure 104 shown in FIG. 1B to a second non-coplanar position as shown in FIG. 1C in response to force 144. As shown in FIG. 1D, keyboard apparatus 180 may include a single row of keys in set 106 rather than multiple rows as shown in other embodiments. The embodiments are not limited in this respect.

FIGS. 2A, 2B, 2C, 2D and 2D illustrate different views of an apparatus 200. Apparatus 200 may comprise a tablet computer, handheld computer, personal digital assistant (PDA), cellular telephone, combination cellular telephone/PDA, smartphone, laptop computer, ultra-laptop computer, portable computer, personal computer (PC), notebook PC, netbook computer, tablet computer, pager, messaging device, media player, digital music player, or other suitable mobile computing device such as a convertible computing system in various embodiments. While described hereinafter as a convertible computing system capable of operating or being arranged in a notebook configuration and a tablet configuration, it should be understood that the embodiments are not limited in this respect.

As shown in FIG. 2A, computing device 200 may comprises or include multiple elements, such as enclosure or housing 202, keyboard 204, lid 206, display 208, hinge bar 210 and hinges 212, 214. While a limited number and arrangement of components are shown in FIG. 1A for purposes of illustration, it should be understood computing device 200 may include any number or arrangement of components and still fall within the described embodiments.

In various embodiments, lid 206 may be coupled to housing 202 such that the lid 206 may be rotated with respect to the housing 202 via hinges 212, 214 and hinge bar 210. In some embodiments, display 208 may be coupled to or integrated within lid 206 on a first side of lid 206 opposite the side of hinges 212, 214 and hinge bar 210. The display 208 may comprise a cathode ray tube (CRTs), liquid crystal displays (LCDs), plasma display, touch screen display or any other type of display. Other embodiments are described and claimed.

Figure 2B:
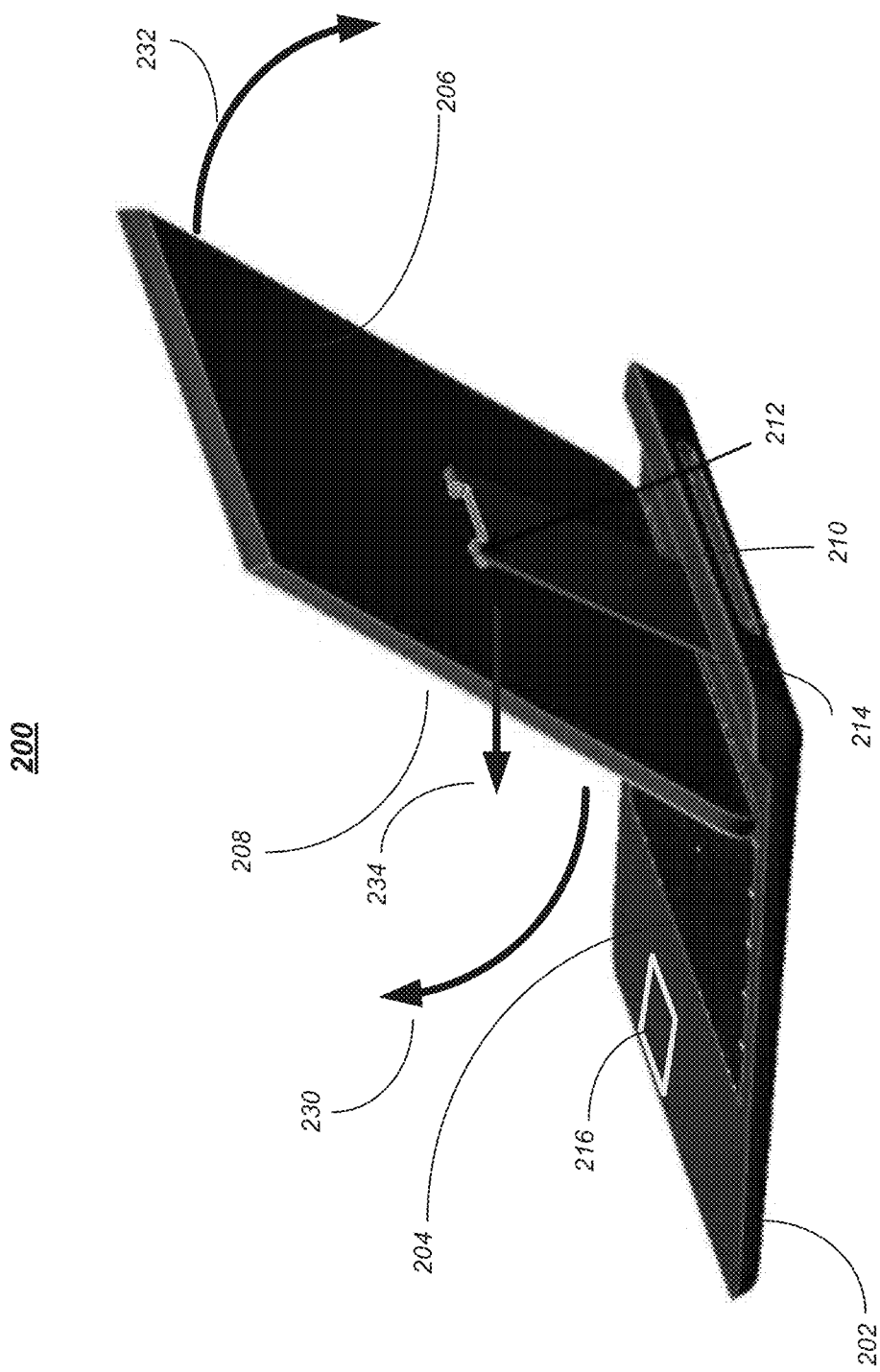
FIG. 2B illustrates one embodiment of a sixth apparatus.

FIG. 2B illustrates a perspective view of computing device 200. As shown in FIG. 2B, computing device 200 may additionally include a trackpad 216 or other input device in addition to keyboard 204. FIG. 2B also more clearly illustrates the arrangement or coupling of housing 202 and lid 206 via hinges 212, 214 and hinge bar 210. Hinge 214 may be pivotally coupled to housing 202 and hinge 212 may be pivotally coupled to lid 206 in some embodiments, and the hinges 212, 214 may be separated by hinge bar 210. In this arrangement, lid 206 may be rotated around hinge bar 210 via hinge 212 and the combination of lid 206 and hinge bar 210 may be rotated around the connection to the housing 202 via hinge 214.

Hinge bar 210 may extend from hinge 214 attached to housing 202 to an area near the middle of a back side of lid 206 at hinge 212 in some embodiments. In various embodiments, this arrangement may allow for computing device 200 to be arranged or operated in either a notebook configuration as shown in FIG. 2B or in a tablet configuration as shown and discussed in more detail with reference to FIG. 2C. For example, the arrangement shown in FIGS. 2A and 2B may allow for a bottom portion of lid 206 to move in a direction indicated by arrow 230, a top portion of lid 206 to move in a direction indicated by arrow 232 and the combination of lid 206, hinge 212 and hinge bar 210 to move in a direction indicated by arrow 234. Based on this arrangement and these movements, lid 206 may be moved from the notebook configuration shown in FIG. 2A where both the display 208 and the keyboard 204 or other input device are accessible, to the tablet configuration shown in FIG. 2C.

FIG. 2C illustrates a perspective view of computing device 200 in a table configuration. As shown in FIG. 2C, computing device 200 may be arranged such that the back side of the lid 206 substantially conceals the keyboard 204 or other input device 216 and the display 208 remains accessible. It is desirable, in some embodiments, for the lid 206 and the housing 202 to fit together and to minimize the stacked or combined height of the lid 206 and housing 202. In various embodiments, to accommodate the hinge 212 and allow for a thin configuration that is aesthetically pleasing, a collapsible keyboard as described with reference to FIGS. 1A, 1B and 1C may be incorporated in computing device 200.

Figure 2D:
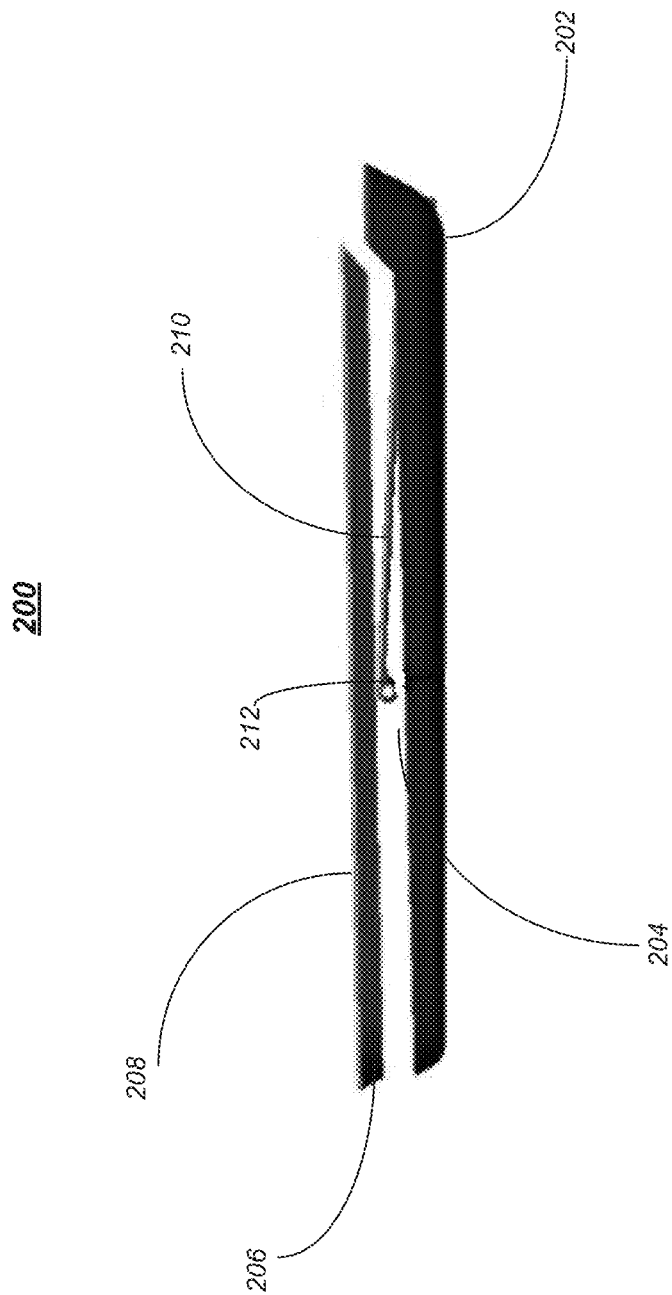
FIG. 2D illustrates one embodiment of a eighth apparatus.

FIG. 2D illustrates a perspective view of computing device 200 in a table configuration when a collapsible keyboard is not incorporated into the system. As shown in FIG. 2D, the hinge assembly 210 (including hinge 212) may come in contact with keyboard 204 in the closed, tablet configuration, leaving a gap or seam between the lid 206 and housing 202. This may lead to an increased system height, which is undesirable, and the resulting configuration may not be aesthetically pleasing. To remedy the aesthetic concerns, a lip may be added to lid 206 to cover the seam, but this does solution does not address the stacked height problem. As a result, it may be desirable to incorporate a collapsible keyboard into the computing device 200.

Figure 2E:
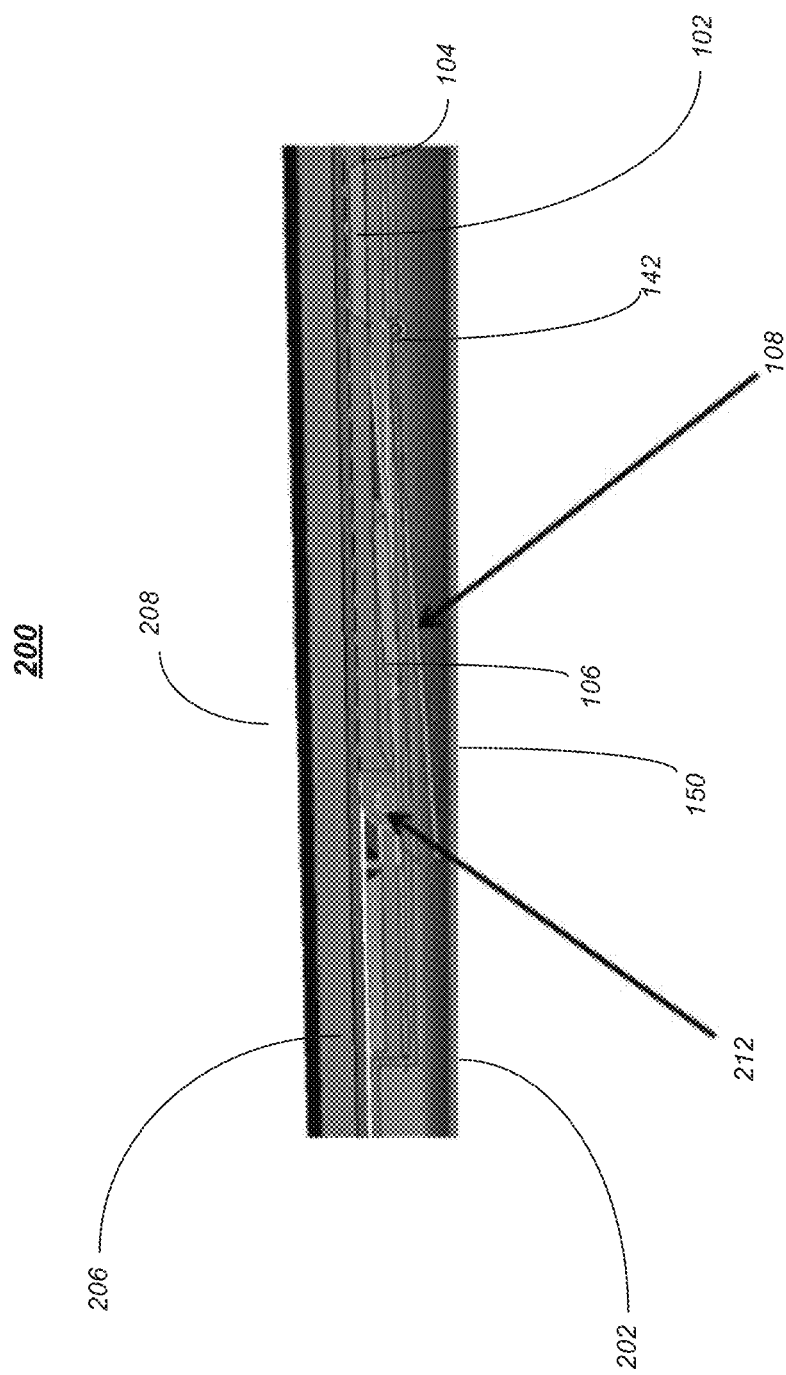
FIG. 2E illustrates one embodiment of a ninth apparatus.

FIG. 2E illustrates a close up view of computing device 200 in a table configuration when a collapsible keyboard is incorporated into the system. For example, in various embodiments a collapsible keyboard as described with reference to FIGS. 1A, 1B and 1C may be incorporated into the computing system 200 to accommodate the hinge 212.

Figure 2F:
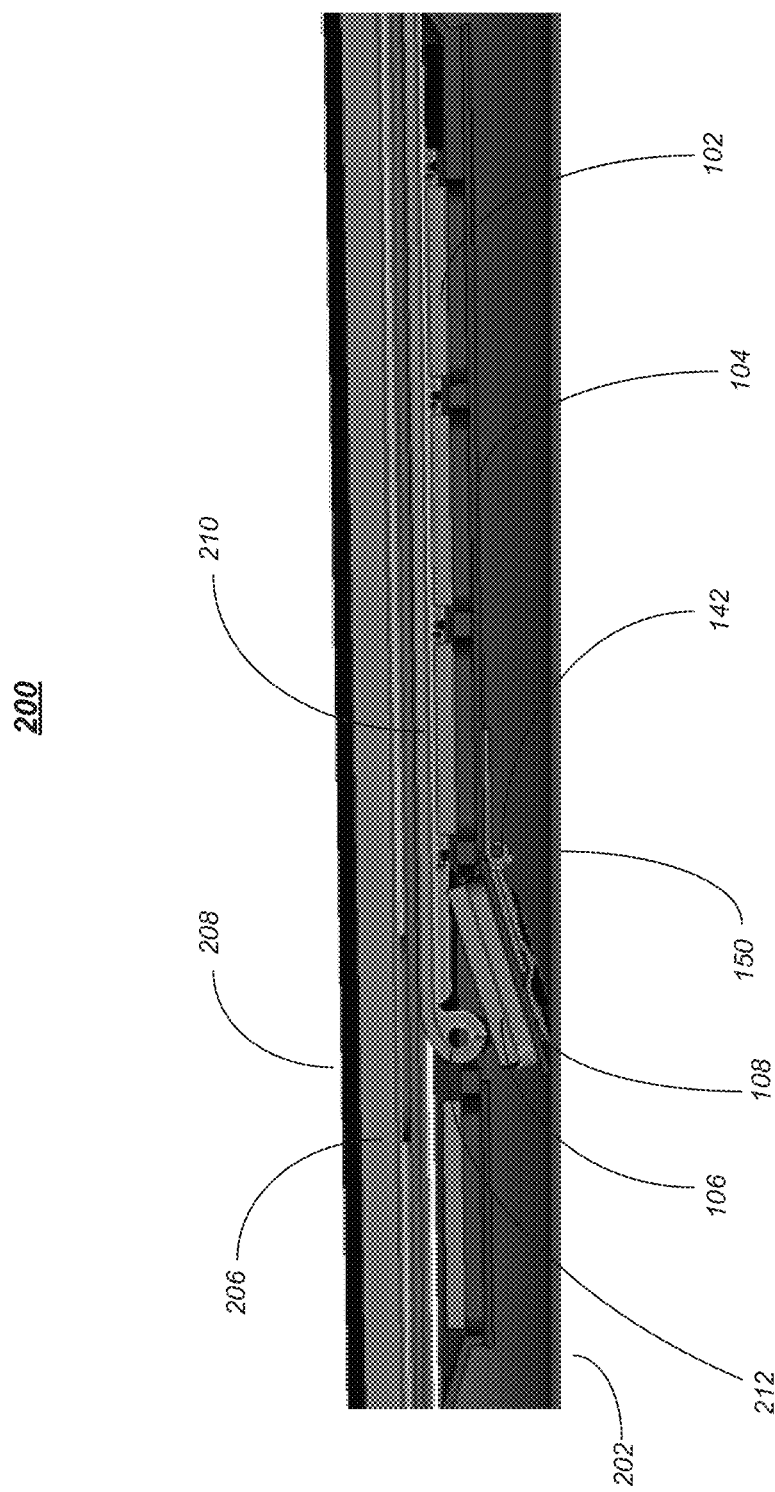
FIG. 2F illustrates ones embodiment of a tenth apparatus.

FIG. 2F illustrates an alternative close up view of computing device 200 in a table configuration when a collapsible keyboard is incorporated into the system. For example, in various embodiments a collapsible keyboard as described with reference to FIGS. 1A, 1B and 1C may be incorporated into the computing system 200 to accommodate the hinge 212. As shown in FIG. 2F, the collapsible keyboard may include single collapsible key or a single row of collapsible keys. The embodiments are not limited in this respect.

In some embodiments, when the lid 206 of the system 200 is closed in the tablet configuration, the moving, or collapsing, portion of the keyboard 204 is allowed to move away from the hinge area 212, thus making more room and not adding to the total stack of the system 200. In various embodiments, when the lid 206 is opened to the notebook configuration, the moving portion 106, 108 of the keyboard 204 springs, or is lifted, back into its normal position relative to the main portion 102, 104 of the keyboard 100 and is normally functional.

In various embodiments, the second support structure 108 of the keyboard may be arranged to rotate away from the one or more hinges 212 to accommodate the one or more hinges 212 below a plane defined by the plurality of keys 102 in the tablet configuration shown in FIGS. 2C and 2E. For example, hinge 212 may be arranged below keys 102 to allow lid 206 to nest securely with housing 202. The embodiments are not limited in this respect.

The second support structure 108 may be arranged to rotate from the second position to the first position in the notebook configuration shown in FIGS. 2A and 2B in response to a force applied by a biasing member 142 arranged at the pivotal coupling 142. For example, a spring or other mechanism may cause the second support structure 108 to automatically return to its coplanar position when the lid 206 and hinge 212 are lifted away from the keyboard.

In some embodiments, one or more magnets 152 may be arranged as shown in FIGS. 2B and 2C to maintain the second support structure 108 in the first/coplanar position in the notebook configuration. For example, the one or more magnets may be arranged to generate a magnetic force that is less than a force applied by the one or more hinges 212 in the tablet configuration. In other embodiments, one or more linkages may be arranged to actuate one or more locking bars to support the second support structure 108 in the first position in the notebook configuration. For example, moving the lid 206 may actuate locking bars, solenoids, motors or other mechanisms that are suitable for holding the second support structure 108 in the first/coplanar position. Other embodiments are described and claimed.

The above-described embodiments may be used to improve system design, functionality, ergonomics and aesthetics in computing devices while minimizing the stacking effect of multiple components. In various embodiments, the above-described techniques and embodiments may be applicable to convertible computing systems and other computing devices that may be arranged or operated in a variety of orientations. In these and other embodiments, including the above-described convertible computing system, incorporation of a collapsible keyboard as described may decrease the overall system height. As such, substantial improvements in computing system design can be achieved through the above-described embodiments.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

FIG. 3 illustrates one embodiment of a logic flow 300. The logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or non-transitory computer-readable instructions to be executed by a logic device (e.g., computer, processor). Logic flow 300 may describe the assembly, manufacture, design or arrangement of the embodiments described above with reference to FIGS. 1A-1C and 2A-2E. Other embodiments are described and claimed.

In various embodiments, a plurality of keys supported by a first support structure may be arranged or pivotally coupled to a set of keys supported by a second support structure at 302. For example, a plurality of keys 102 supported by support structure 102 may be arranged or pivotally coupled to a set of keys 106 supported by support structure 108. In some embodiments, the second support structure may be arranged to be biased in a first position substantially coplanar with the first support structure at 304. For example, biasing member 142 may be arranged to support the second support structure 108 in a coplanar position with the first support structure 104.

In various embodiments, the second support structure may be arranged to rotate around the pivotal coupling from a first position to a second non-coplanar position in response to a force applied to the second support structure at 306. For example, second support structure may be arranged to pivot from the coplanar position shown in FIG. 1B to the non-coplanar position shown in FIG. 2C in response to a force applied to the second support structure by hinge 212 when a lid of a computing device 200 is placed in a tablet configuration as shown in FIG. 2E. Other embodiments are described and claimed.

In some embodiments, the second support structure may be arranged to rotate from the first position to the second position when a computing device is arranged in a tablet configuration. For example, the hinge 212 may move or force the second support structure 108 into the non-coplanar position as shown in FIG. 2E. In various embodiments, the second support structure may be arranged to rotate from the second position to the first position when the computing device is arranged in a notebook configuration. For example, when the lid 206 is lifted from the tablet configuration shown in FIGS. 2C and 2E into the notebook configuration shown in FIGS. 2A and 2B, a biasing member 142 or other suitable components may be operative to automatically move the second support structure to the coplanar position shown in FIG. 1B.

The second support structure may be arranged to rotate away from one or more hinges arranged to couple a lid to a housing of a computing device to accommodate the one or more hinges below a plane defined by the plurality of keys when the computing device is arranged in a tablet configuration in some embodiments. For example, as shown in FIG. 2E, hinge 212 may be accommodated by the movement of second support structure 108 allowing hinge 212 to next below the plane defined by the tops of keys 102. This arrangement may allow for the lid to nest closely and securely with the housing 202 and may reduce the overall system thickness. Other embodiments are described and claimed.

Figure 4:
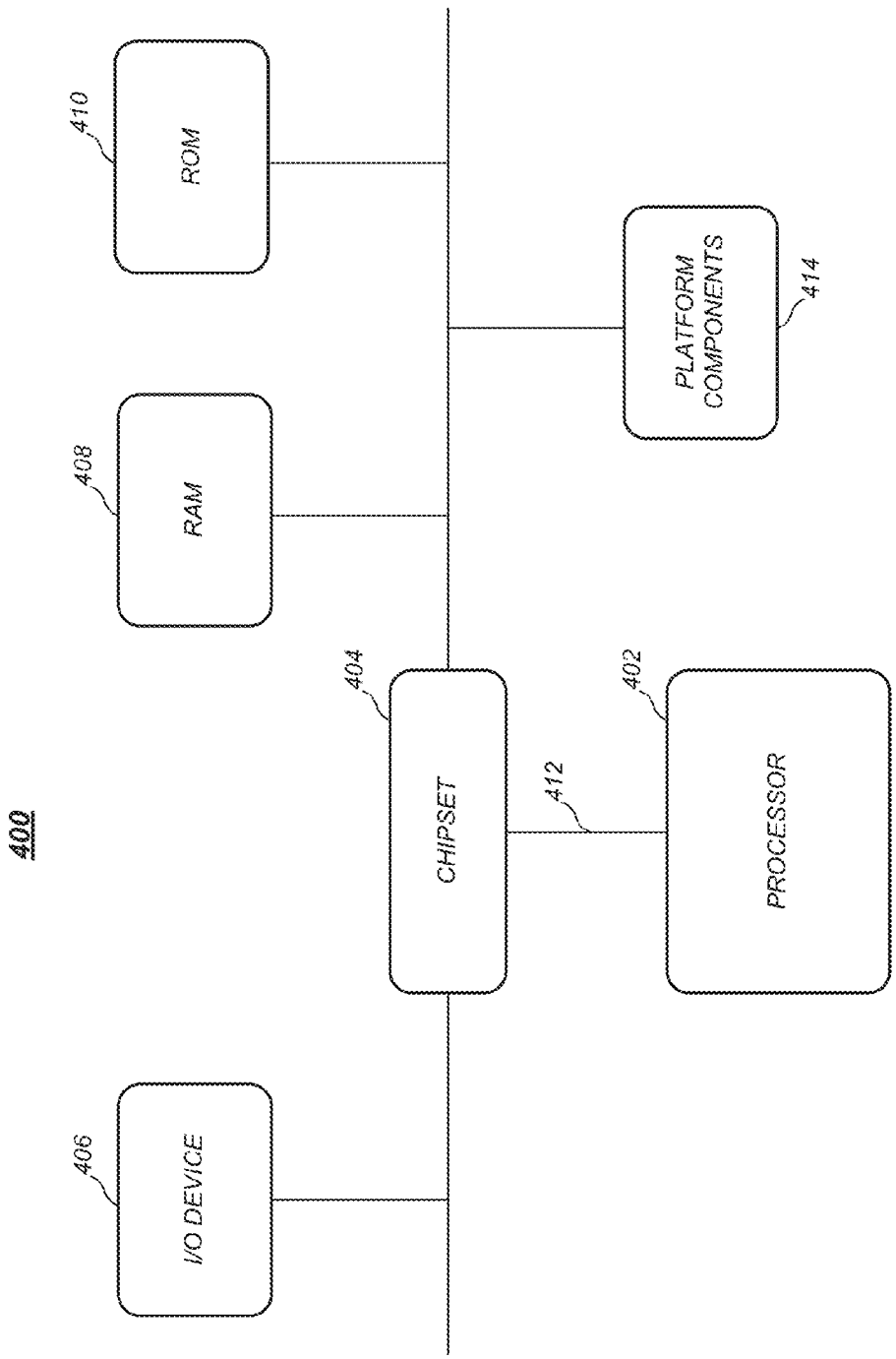
FIG. 4 illustrates one embodiment of a system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

In particular, the platform components 414 may include a cooling system implementing various thermal management techniques. The cooling system may be sized for the system 400, and may include any cooling elements designed to perform heat dissipation, such as heat pipes, heat links, heat transfers, heat spreaders, vents, fans, blowers, crossflow blowers and liquid-based coolants.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A collapsible keyboard apparatus, comprising: a plurality of keys supported by a first support structure; and
a set of keys supported by a second support structure pivotally coupled, via a pivotal coupling, to the first support structure;
the second support structure arranged to rotate around the pivotal coupling from a first position substantially coplanar with the first support structure to a second non-coplanar position in response to a force applied to the second support structure by one or more hinges, such that the second support structure rotates away from the one or more hinges arranged to couple a lid to a housing of a computing device, to accommodate the one or more hinges below a plane defined by the plurality of keys when the computing device is arranged in a tablet configuration.

2. The collapsible keyboard apparatus of claim 1, the second support structure arranged to rotate from the first position to the second position in response to a force applied to the second support structure between two or more of the set of keys or to one or more spacers between two or more of the set of keys.

3. The collapsible keyboard apparatus of claim 1, the second support structure arranged to rotate from the second position to the first position in response to a force applied by a biasing member arranged at the pivotal coupling.

4. The collapsible keyboard apparatus of claim 3, the pivotal coupling comprising a hinge and the biasing member comprising a spring.

5. The collapsible keyboard apparatus of claim 1, comprising:
one or more magnets arranged to maintain the second support structure in the first position.

6. The collapsible keyboard apparatus of claim 5, the one or more magnets arranged to generate a magnetic force that is less than a force applied between two or more of the set of keys to cause the second support structure to rotate to the second position.

7. The collapsible keyboard apparatus of claim 1, comprising:
a base structure arranged to support the first and second support structures, the base structure arranged to prevent over rotation of the second support structure in the second position.

8. A computing device, comprising:
a housing having an input device arranged on a side of the housing; and
a lid coupled to the housing by a hinge, the lid having a digital display arranged on a side of the lid;
the computing device convertible between a notebook configuration and a tablet configuration, a portion of the input device moveably arranged to accommodate the hinge within the housing, when the computing device is arranged in the tablet configuration.

9. The computing device of claim 8, the notebook configuration comprising a configuration in which the input device and the display are accessible and the tablet configuration comprising a configuration in which the display is accessible and another side of the lid is arranged to substantially conceal the input device.

10. The computing device of claim 8, the hinge pivotally coupled at a first end to the housing and pivotally coupled at a second end to the lid.

11. The computing device of claim 8, the input device comprising a keyboard comprising:
a plurality of keys supported by a first support structure; and
a set of keys supported by a second support structure pivotally coupled, via a pivotal coupling, to the first support structure;
the second support structure arranged to rotate around the pivotal coupling from a first position substantially coplanar with the first support structure to a second non-coplanar position in response to a force applied to the second support structure by the hinge.

12. The computing device of claim 11, the second support structure arranged to rotate from the first position to the second position in the tablet configuration in response to a force applied to the second support structure between two or more of the set of keys or to one or more spacers between two or more of the set of keys by the hinge.

13. The computing device of claim 11, the second support structure arranged to rotate from the second position to the first position in the notebook configuration in response to a force applied by a biasing member arranged at the pivotal coupling.

14. The computing device of claim 11, the second support structure arranged to rotate away from the hinge to accommodate the hinge below a plane defined by the plurality of keys in the tablet configuration.

15. The computing device of claim 11, comprising:
one or more magnets arranged to maintain the second support structure in the first position in the notebook configuration, the one or more magnets arranged to generate a magnetic force that is less than a force applied by the hinge in the tablet configuration.

16. The computing device of claim 11, comprising:
a linkage arranged to actuate a locking bar to support the second support structure in the first position in the notebook configuration.

17. The computing device of claim 11, comprising:
a second input device comprising a pointing device arranged on a side of the housing.

18. A method, comprising:
arranging a plurality of keys supported by a first support structure to be pivotally coupled, via a pivotal coupling, to a set of keys supported by a second support structure; and
arranging the second support structure to be biased in a first position substantially coplanar with the first support structure;
the second support structure to rotate around the pivotal coupling from the first position to a second non-coplanar position in response to a force applied to the second support structure by one or more hinges, wherein the second support structure rotates away from the one or more hinges arranged to couple a lid to a housing of a computing device, to accommodate the one or more hinges in the housing, below a plane defined by the plurality of keys when the computing device is arranged in a tablet configuration.

19. The method of claim 18, the second support structure to rotate from the first position to the second position when a computing device is arranged in a tablet configuration and the second support structure to rotate from the second position to the first position when the computing device is arranged in a notebook configuration.

* * * * *